United States Patent
Lee et al.

(10) Patent No.: US 7,645,063 B2
(45) Date of Patent: Jan. 12, 2010

(54) BACKLIGHT UNIT

(75) Inventors: Seok Woo Lee, Seoul (KR); Do Yune Kim, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/143,656

(22) Filed: Jun. 3, 2005

(65) Prior Publication Data

US 2006/0002152 A1    Jan. 5, 2006

(30) Foreign Application Priority Data

Jun. 30, 2004    (KR) ................. 10-2004-0050328

(51) Int. Cl.
F21V 8/00    (2006.01)
(52) U.S. Cl. ............... 362/561; 362/560; 362/609
(58) Field of Classification Search ........... 362/561, 362/608, 609, 610, 621, 628, 560, 551, 559, 362/511, 330, 606, 603, 607, 616; 349/63, 349/65, 67
See application file for complete search history.

(56) References Cited

U.S. PATENT DOCUMENTS

| | | | |
|---|---|---|---|
| 5,617,251 A * | 4/1997 | Ohta et al. ............... 359/599 |
| 5,980,046 A * | 11/1999 | Park ........................ 353/122 |
| 6,034,750 A | 3/2000 | Rai et al. | |
| 6,239,851 B1 | 5/2001 | Hatazawa et al. | |
| 6,283,602 B1 | 9/2001 | Kawaguchi et al. | |
| 6,648,485 B1 * | 11/2003 | Colgan et al. ............ 362/600 |
| 6,655,810 B2 * | 12/2003 | Hayashi et al. .......... 362/600 |
| 6,761,475 B2 * | 7/2004 | Perlo et al. .............. 362/511 |
| 7,021,813 B2 * | 4/2006 | Lee et al. ................. 362/609 |
| 2004/0114343 A1 * | 6/2004 | Ho .......................... 362/31 |

FOREIGN PATENT DOCUMENTS

| | | |
|---|---|---|
| CN | 2619291 Y | 6/2004 |
| JP | 6-138458 A | 5/1994 |
| JP | 6-174929 A | 6/1994 |
| JP | 9-211232 A | 8/1997 |
| JP | 11-273436 A | 10/1999 |
| JP | 2000-260216 A | 9/2000 |
| JP | 2002-319308 A | 10/2002 |
| JP | 2002-352615 A | 12/2002 |
| JP | 2003-168310 A | 6/2003 |

(Continued)

OTHER PUBLICATIONS

Communication from German Patent Office dated Aug. 30, 2006.

*Primary Examiner*—Sharon E Payne
(74) *Attorney, Agent, or Firm*—McKenna Long & Aldridge LLP

(57) ABSTRACT

A backlight unit, in which an incident surface of a light-guiding plate is formed in a shape of a curve, or a curve-shaped structure is formed in a housing to improve the light efficiency. The backlight unit includes a light source emitting light; a housing surrounding the light source; a light-guiding plate guiding the light emitted from the light source to an LCD panel, wherein the light-guiding plate has an incident surface formed in a shape of a curve; and a reflective sheet formed under the light-guiding plate.

7 Claims, 4 Drawing Sheets

FOREIGN PATENT DOCUMENTS

| | | |
|---|---|---|
| KR | 1990-0016933 | 11/1990 |
| KR | 1998-053134 | 10/1998 |
| KR | 10-2002-0041667 | 6/2002 |
| TW | 592306 | 6/2004 |
| WO | WO 2004/006002 | 1/2004 |

* cited by examiner

BACKLIGHT UNIT

This application claims the benefit of the Korean Application No. P2004-50328 filed on Jun. 30, 2004, which is hereby incorporated by reference for all purposes as if fully set forth herein.

BACKGROUND OF THE INVENTION

1. Field of the Invention

The present invention relates to a backlight unit. More particularly, the present invention relates to a backlight unit in which an incident surface of a light-guiding plate is formed in a shape of a curve, or a curve-shaped structure is formed in a housing to improve the light efficiency.

2. Discussion of the Related Art

Among the various ultra-thin, flat type display devices, which include a display screen having a thickness of several centimeters, a liquid crystal display (LCD) device can be widely used for notebook computers, monitors, aircraft, and etc.

Unlike other flat type display devices, the LCD device can not emit light by itself. In this respect, the LCD device requires a backlight unit provided in the rear of an LCD panel, wherein the backlight unit is used as a light source for the LCD device.

The backlight unit may be classified as a direct type or an edge type.

In a case of the direct type backlight unit, a plurality of lamps are arranged at an entire lower surface of an LCD panel, whereby light is directly transmitted to the LCD panel. In the edge type backlight unit, a lamp is formed in one lower edge of an LCD panel, and light is transmitted to the LCD panel by a light-guiding plate.

Hereinafter, a related art edge type backlight unit will be described with reference to the accompanying drawings.

FIG. 1 is a cross sectional view of a related art edge type backlight unit. As shown in FIG. 1, the related art edge type backlight unit includes a lamp 10, a housing 20, a light-guiding plate 30, and a reflective sheet 40. At this time, the lamp 10 is provided at one lower edge of an LCD panel (not shown) to emit the light. Also, the housing 20, surrounding the lamp 10, protects and supports the lamp 10. The light-guiding plate 30 is formed below the LCD panel, wherein one side of the light-guiding plate 30 is opposite to the lamp 10. Thus, the light-guiding plate 30 guides light emitted from the lamp 10 to the LCD panel. Then, the reflective sheet 40 is formed under the light-guiding plate 30 to reflect the light leaking in an opposite side of the LCD panel to the light-guiding plate 30.

Although not shown, optical sheets, such as a diffusion sheet; a prism sheet and a protective sheet, are provided on the light-guiding plate 20, whereby the light guided by the light-guiding plate is uniformly diffused to the LCD panel. Also, the lamp 10, the housing 20, the light-guiding plate 30, the reflective sheet 40, and the optical sheets are taken into a main support 50.

An operation of the related art edge type backlight unit will be described as follows.

First, the light emitted from the lamp 10 may be incident on the incident surface of the light-guiding plate 30. In another way, the light emitted from the lamp 10 is reflected on the housing 20 surrounding the lamp 10, and then the reflected light is incident on the incident surface of the light-guiding plate 30.

Some of the incident light is directly reflected to the upper surface of the light-guiding plate 30. Also, some of the incident light leaks out to the lower side of the light-guiding plate 30, and then the light is reflected by the reflective sheet 40 and is sent to the LCD panel.

The light guided by the light-guiding plate 30 is incident on the LCD panel through the optical sheets, wherein the optical sheets are comprised of the diffusion sheet, the prism sheet, and the protective sheet. At this time, the diffusion sheet serves to uniformly diffuse the light guided by the light-guiding plate 30 to the LCD panel. Also, the prism sheet serves to guide the light vertically. The protective sheet is provided on the prism sheet to protect protruding and recess patterns formed in the prism sheet.

Thus, the light emitted from the backlight unit is transmitted to the LCD panel, thereby displaying images. In the total amount of energy for operating the LCD device, a considerable amount of energy is used in the backlight unit. In this respect, it is necessary to improve the light efficiency of backlight unit so as to improve the light efficiency of the LCD device.

However, the related art backlight unit has the following disadvantages.

When the light is emitted from the lamp 10 of the backlight unit, the lamp 10 absorbs the light. Also, the housing 20 surrounding the lamp 10 absorbs the light, thereby lowering the light efficiency. Accordingly, there have been demands for a backlight unit that can obtain high light efficiency.

SUMMARY OF THE INVENTION

Accordingly, the present invention is directed to a backlight unit that substantially obviates one or more problems due to limitations and disadvantages of the related art.

An advantage of the present invention is to provide a backlight unit in which an incident surface of a light-guiding plate is formed in a shape of a curve, or a curve-shaped structure is formed in a housing to improve the light efficiency.

Additional advantages and features of the invention will be set forth in the description which follows, and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a light source emitting light; a housing surrounding the light source; a light-guiding plate guiding the light emitted from the light source to an LCD panel, wherein the light-guiding plate has an incident surface formed in a shape of a curve; and a reflective sheet formed under the light-guiding plate.

In another aspect, a backlight unit includes a light source emitting light; a housing surrounding the light source; a light-guiding plate guiding the light emitted from the light source to an LCD panel; a reflective sheet formed under the light-guiding plate; and a structure having sides in a shape of a curve and formed inside the housing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incor- In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Hereinafter, a backlight unit according to the present invention will be described with reference to the accompanying drawings.

Figure 1:
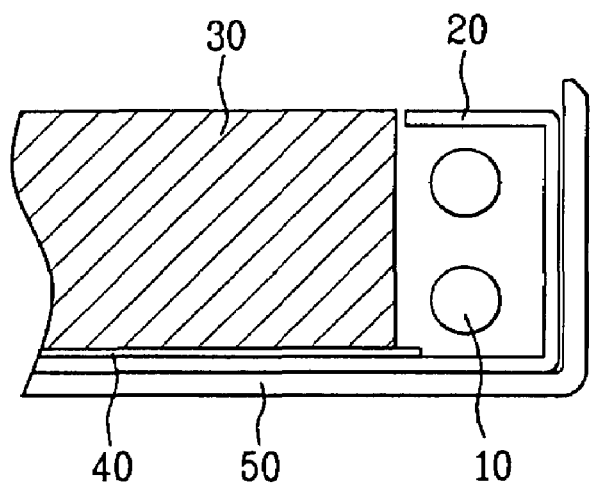
FIG. 1 is a cross sectional view of a backlight unit according to the related art.
Figure 2:
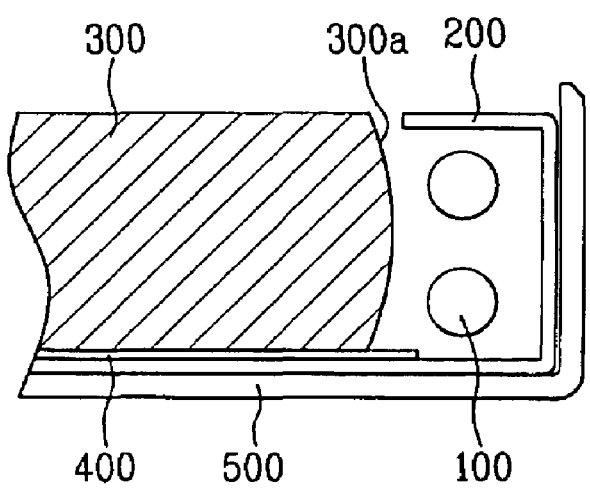
FIG. 2 is a cross sectional view of a backlight unit according to a first embodiment of the present invention.

FIG. 2 is a cross sectional view of a backlight unit according to the first embodiment of the present invention. As shown in FIG. 2, the backlight unit according to the first embodiment of the present invention includes a light source 100, a housing 200, a light-guiding plate 300, and a reflective sheet 400. The light source 100 is formed at one side of an LCD panel (not shown) to emit light to the LCD panel. Also, the housing 200 surrounding the light source 100 protects and supports the light source 100. The light-guiding plate 300 is formed below the LCD panel to guide the light emitted from the light source 100 to the LCD panel. The reflective sheet 400 is formed under the light-guiding plate 300, whereby the light leaking in an opposite side of the LCD panel is reflected to the light-guiding plate 300. The light source 100, the housing 200, the light-guiding plate 300, and the reflective sheet 400 are taken into a main support 500.

Although not shown, an optical sheet such as a diffusion sheet, a prism sheet and a protective sheet may be provided between the light-guiding plate 300 and the LCD panel, to uniformly diffuse the light guided by the light-guiding plate 300 to the LCD panel.

The light source 100 may be formed of a cold cathode fluorescent lamp CCFL. In the drawings, two lamps 100 are provided as the light source 100. However, the number of lamps, in which the lamps function as the light source, may vary according to the size and purpose of the LCD device.

The housing 200 surrounding the light source 100 reflects the light emitted from the light source 100 to the light-guiding plate 300. Preferably, a reflective material such as silver is coated on the inner surface of the housing 200.

The light-guiding plate 300 is formed opposite the light source 100 so that the light emitted from the light source 100 or reflected on the housing 200 is incident on the inside of the light-guiding plate 300. At this time, an incident surface 300a of the light-guiding plate 300 is formed in shape of a convex surface. As compared with a linear-shaped incident surface of a light-guiding plate in a related art backlight unit, the convex-shaped incident surface of the light-guiding plate 300 has the increased surface area so the amount of incident light increases. Also, the incident light is concentrated so that the light efficiency is improved.

The convex shape of the incident surface 300a of the light-guiding plate 300 increases the amount of incident light and improves the concentration of incident light. On forming the convex-shaped incident surface 300a of the light-guiding plate 300, its curvature may be variable.

The light-guiding plate 300 is not limited in material. Preferably, the light-guiding plate 300 is formed of a material having great strength and transmittivity, for example, an acryl resin such as PMMA.

The reflective sheet 400 is formed under the light-guiding plate 300, so the light leaking in the opposite side of the LCD panel is reflected to the light-guiding plate 300. The material for the reflective sheet 400 may be variable.

Figure 3:
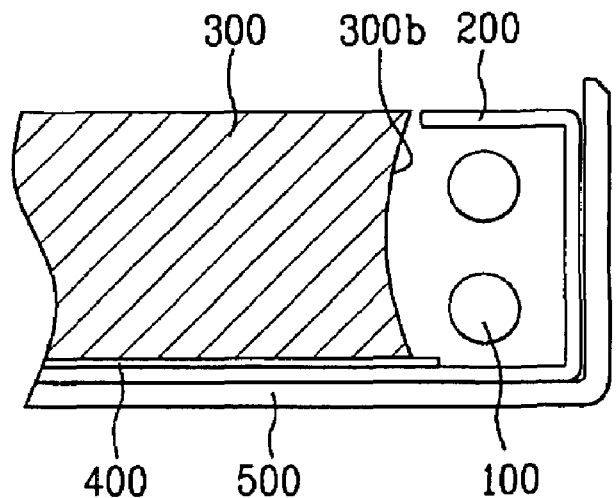
FIG. 3 is a cross sectional view of a backlight unit according to a second embodiment of the present invention.

FIG. 3 is a cross sectional view of a backlight unit according to the second embodiment of the present invention. Except that an incident surface 300b of a light-guiding plate 300 is formed in a shape of a concave surface. The backlight unit according to the second embodiment of the present invention is similar in structure to the backlight unit according to the first embodiment of the present invention. On explaining the backlight unit according to the second embodiment of the present invention, the same reference numbers will be used to refer to the same parts as those of the backlight unit according to the first embodiment of the present invention, and the repeated explanation for the same parts will be omitted.

In the backlight unit according to the second embodiment of the present invention, the incident surface 300b of the light-guiding plate 300 is formed in shape of the concave surface. Accordingly, as compared with a linear-shaped incident surface of a light-guiding plate in a related art backlight unit, the concave-shaped incident surface 300b of the light-guiding plate 300 has an increased incidence area so the amount of incident light increases. Also, the incident light is so concentrated that the light efficiency is improved. The curvature of the concave-shaped incident surface 300b of the light-guiding plate 300, may vary.

Figure 4:
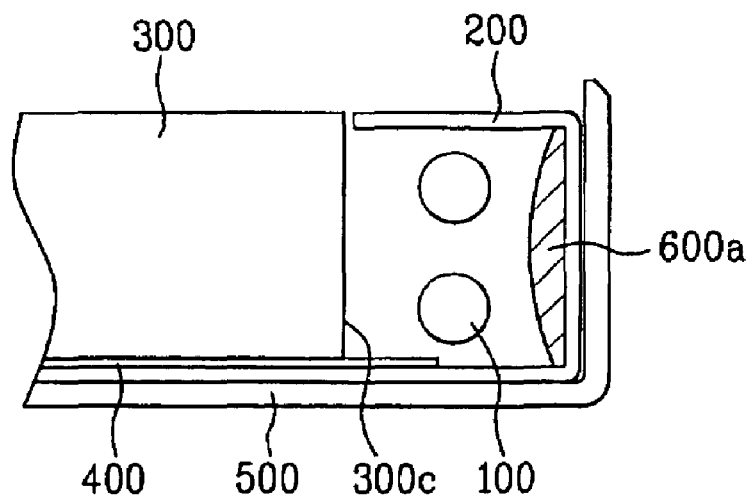
FIG. 4 is a cross sectional view of a backlight unit according to a third embodiment of the present invention.

FIG. 4 is a cross sectional view of a backlight unit according to a third embodiment of the present invention. In the backlight unit according to the third embodiment of the present invention, as shown in FIG. 4, structures of a light source 100, a housing 200, a light-guiding plate 300 and a reflective sheet 400 are identical to those in a backlight unit according to the related art. However, the backlight unit according to the third embodiment of the present invention additionally includes a convex-shaped structure 600a formed in the housing 200.

The light-source 100 is formed, for example, of a cold cathode fluorescent lamp CCFL. Also, the housing 200 surrounding the light source 100 reflects the light emitted from the light source 100 to the light-guiding plate 300. A reflective material such as silver may be coated on the inner surface of the housing 200.

In more detail, the convex-shaped structure 600a is formed inside the housing 200 opposite the light-guiding plate 300 relative to the light source 100. Also, the convex-shaped structure 600a may be formed of a reflective material to reflect light or a transmitting material that transmits light. If the convex-shape structure 600a is formed of a reflective material, the light emitted from the light source 100 is reflected on the convex-shaped structure 600a, and then a reflected light is incident on the light-guiding plate 300. In this case, the convex-shaped structure 600a functions as a convex mirror so the light incident on the light-guiding plate 300 is widely diffused. As a result, it is possible to improve the light efficiency. If the convex-shaped structure 600a is formed of a transmitting material, the light emitted from the light source 100 passes through the convex-shaped structure 600a, and then the light is reflected on the housing 200 and is incident on the light-guiding plate 300. In this case, the convex-shaped structure 600a functions as a convex lens, so the light is concentrated, thereby improving the light efficiency. The curvature of the convex-shaped structure 600a may be variable.

The light-guiding plate 300 is formed opposite the light source 100. An incident surface 300c of the light-guiding plate 300 is formed in a linear shape. The light-guiding plate 300 is not limited in material. The light-guiding plate 300 is formed of a material having great strength and transmittivity, for example, acryl resin such as PMMA.

The reflective sheet 400 is formed under the light-guiding plate 300 to reflect light leaking out to the lower side toward the light-guiding plate 300.

Although not shown, optical sheets may be provided on the light-guiding plate 300. The optical sheets may include a diffusion sheet, a prism sheet, and a protective sheet.

Figure 5:
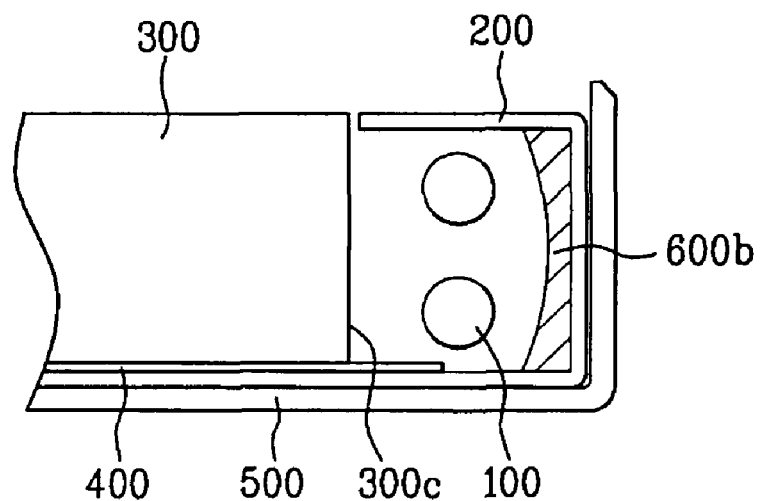
FIG. 5 is a cross sectional view of a backlight unit according to a fourth embodiment of the present invention.

FIG. 5 is a cross sectional view of a backlight unit according to the fourth embodiment of the present invention. As shown in FIG. 5, except that a concave-shaped structure 600b is formed in a housing 200, the backlight unit according to the fourth embodiment of the present invention is identical to the backlight unit according to the third embodiment of the present invention. On explaining the backlight unit according to the fourth embodiment of the present invention, the same reference numbers will be used to refer to the same parts as those of the backlight unit according to the third embodiment of the present invention, and the repeated explanation for the same parts will be omitted.

In the backlight unit according to the fourth embodiment of the present invention, the concave-shaped structure 600b may be formed of a reflective material or a transmitting material. If the concave-shaped structure 600b is formed of the reflective material, the light emitted from the light source 100 is reflected on the concave-shaped structure 600b, and then the reflected light is incident on the light-guiding plate 300. In this case, the concave-shaped structure 600b functions as a concave mirror so the light incident on the light-guiding plate 300 is concentrated, thereby improving the light efficiency. If the concave-shaped structure 600b is formed of the transmitting material, the light emitted from the light source 100 passes through the concave-shaped structure 600b, and then the light is reflected on the housing 200, and is incident on the light-guiding plate 300. In this case, the concave-shaped structure 600b functions as a concave lens, so the incident light is widely diffused. As a result, it is possible to improve the light efficiency. The curvature of the concave-shaped structure 600b may be variable.

Figure 6:
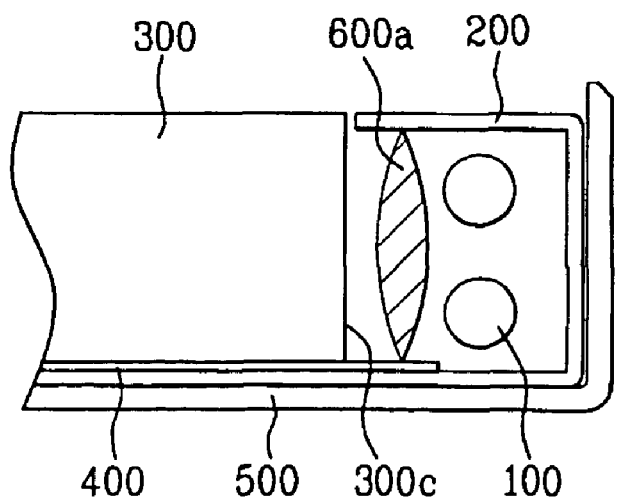
FIG. 6 is a cross sectional view of a backlight unit according to a fifth embodiment of the present invention.

FIG. 6 is a cross sectional view of a backlight unit according to the fifth embodiment of the present invention. As shown in FIG. 6, except that a convex-convex structure 600a is formed between a light source 100 and a light-guiding plate 300, the backlight unit according to the fifth embodiment of the present invention is identical to the backlight unit according to the third embodiment of the present invention. On explaining the backlight unit according to the fifth embodiment of the present invention, the same reference numbers will be used to refer to the same parts as those of the backlight unit according to the third embodiment of the present invention, and the repeated explanation for the same parts will be omitted.

In the backlight unit according to the fifth embodiment of the present invention, the convex-convex structure 600a is formed between the light source 100 and the light-guiding plate 300. Accordingly, the light emitted from the light source 100 or reflected on the housing 200 passes through the convex-convex structure 600a, and then is incident on the light-guiding plate 300. The convex-convex structure 600a is formed, for example, of a transmitting material. Also, the convex-convex structure 600a functions as a convex lens, so that it is possible to improve the concentration of light incident on the light-guiding plate 300.

Figure 7:
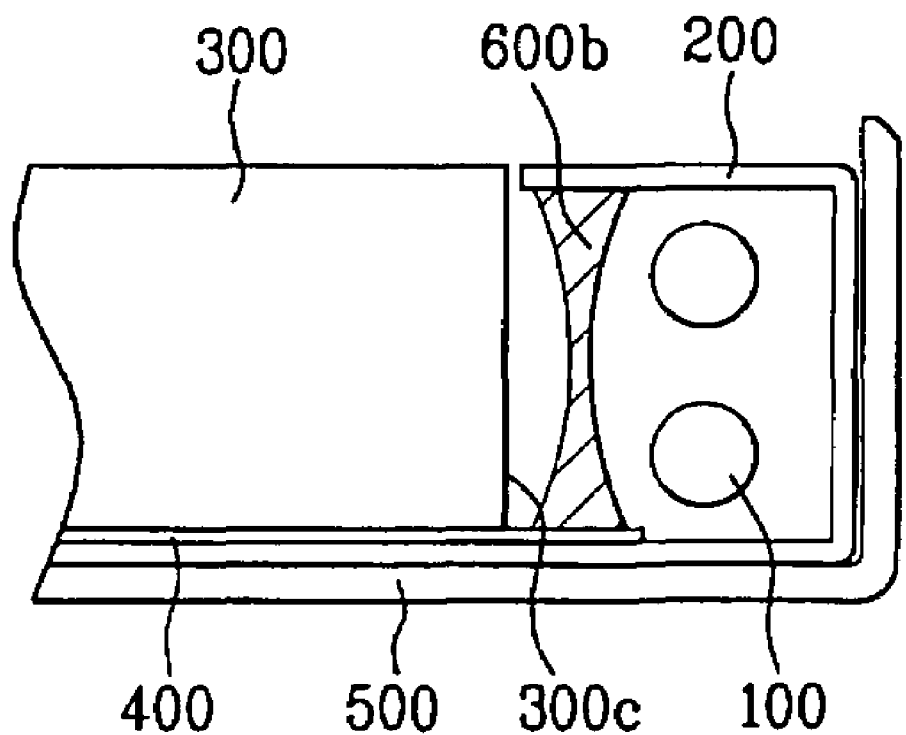
FIG. 7 is a cross sectional view of a backlight unit according to a sixth embodiment of the present invention.

FIG. 7 is a cross sectional view of a backlight unit according to the sixth embodiment of the present invention. As shown in FIG. 7, the backlight unit according to the sixth embodiment of the present invention is characterized by a concave-concave structure 600b formed between a light source 100 and a light-guiding plate 300. Except that the concave-concave structure 600b, the backlight unit according to the sixth embodiment of the present invention is identical in structure to the backlight unit according to the fifth embodiment of the present invention. On explaining the backlight unit according to the sixth embodiment of the present invention, the same reference numbers will be used to refer to the same parts as those of the backlight unit according to the fifth embodiment of the present invention, and the repeated explanation for the same parts will be omitted.

In the backlight unit according to the sixth embodiment of the present invention, the concave-concave structure 600b is formed between the light source 100 and the light-guiding plate 300. Accordingly, the light emitted from the light source 100 or reflected on the housing 200 passes through the concave-concave structure 600b, and then is incident on the light-guiding plate 300. The concave-concave structure 600b is formed, for example, of a transmitting material. Also, the concave-concave structure 600b functions as a concave lens so that the light incident on the light-guiding plate 300 is widely diffused, thereby improving the light efficiency.

Although not shown, the light-guiding plate having the concave or convex shaped incident surface of FIG. 2 or FIG. 3 may be formed together with the convex-convex or concave-concave structure to maximize the concentrating or diffusing of incident light.

As mentioned above, the backlight unit according to the present invention has the following advantages.

In the backlight unit according to the present invention, the convex or concave shaped incident surface of the light-guiding plate increase the incidence area. Also, it is possible to maximize the concentrating or diffusion of incident light by forming a convex or concave shaped incident surface of the light-guiding plate.

Also, a convex-convex or concave-concave structure may be formed in the housing so the light efficiency is improved with the maximization in the concentrating or diffusion of incident light.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A backlight unit comprising:
at least one light source emitting light;
a light-guiding plate guiding the light emitted from the light source onto an incident surface of the light guiding plate to an LCD panel;

a housing surrounding the light source, wherein the housing has a flat side surface opposite the incident surface of the light guiding plate;

a reflective sheet formed under the light-guiding plate; and a structure having a convex or concave side surface and a flat side surface in contact with the flat side surface of the housing, and formed of a reflective material, wherein the structure is entirely formed on the flat side surface of the housing so that the convex or concave side surface opposite the incident surface of the light guiding plate and the light source is entirely curve shape, and wherein the structure reflects light from the light source in a direction towards the incident surface of the light-guiding plate.

2. The backlight unit of claim 1, wherein the incident surface of the light-guiding plate is formed in a shape of a curve for receiving the light emitted from the light source.

3. The backlight unit of claim 2, wherein the incident surface of the light-guiding plate is formed in a convex shape.

4. The backlight unit of claim 2, wherein the incident surface of the light-guiding plate is formed in a concave shape.

5. The backlight unit of claim 1, further comprising optical sheets between the light-guiding plate and the LCD panel.

6. A method of fabricating a backlight unit, comprising:
providing at least one light source to emit light;
forming a light-guiding plate to guide the light emitted from the light source onto an incident surface of the light guiding plate to a LCD panel;
forming a housing surrounding the light source, wherein the housing has a flat side surface opposite the incident surface of the light guiding plate;
forming a reflective sheet under the light-guiding plate; and
forming a structure having a convex or concave side surface and a flat side surface in contact with the flat side surface of the housing and formed of reflective material, wherein the structure is entirely formed on the flat side surface of the housing so that the convex or concave side surface opposite the incident surface of the light guiding plate and the light source is entirely curve shape, and wherein the structure reflects light from the light source in a direction towards the incident surface of the light-guiding plate.

7. The method of claim 6, wherein forming the light-guiding plate includes forming the incident surface in a shape of one of convex shape and a concave shape.

\* \* \* \* \*